(12) United States Patent
Scott

(10) Patent No.: US 9,638,239 B2
(45) Date of Patent: May 2, 2017

(54) CABLE LUBRICATION DEVICE

(71) Applicant: Steven Richard Scott, Los Gatos, CA (US)

(72) Inventor: Steven Richard Scott, Los Gatos, CA (US)

(73) Assignee: Motion Pro, Inc., Loomis, CA (US)

( * ) Notice: Subject to any disclaimer, the term of this patent is extended or adjusted under 35 U.S.C. 154(b) by 78 days.

(21) Appl. No.: 14/788,276

(22) Filed: Jun. 30, 2015

(65) Prior Publication Data

US 2017/0002856 A1    Jan. 5, 2017

(51) Int. Cl.
| | |
|---|---|
| F16N 7/16 | (2006.01) |
| F16N 7/24 | (2006.01) |
| F16N 13/22 | (2006.01) |
| F16C 1/24 | (2006.01) |
| B62J 31/00 | (2006.01) |
| F16C 1/10 | (2006.01) |

(52) U.S. Cl.
CPC .............. *F16C 1/24* (2013.01); *B62J 31/00* (2013.01); *F16C 1/107* (2013.01)

(58) Field of Classification Search
CPC ...... F16C 1/24; F16C 1/107; Y10T 74/20462; Y10T 74/2045; F16N 2210/34
USPC ....................................................... 184/15.1
See application file for complete search history.

(56) References Cited

U.S. PATENT DOCUMENTS

| | | | | |
|---|---|---|---|---|
| 1,589,108 A | * | 6/1926 | Caretta ................... | F16C 1/107 184/15.1 |
| 2,083,937 A | * | 6/1937 | Begg ........................ | F16C 1/24 138/131 |
| 2,681,711 A | * | 6/1954 | Sievenpiper .............. | F16C 1/24 184/105.1 |
| 3,101,812 A | * | 8/1963 | Mercer, Sr. ............. | F16N 21/00 141/383 |
| 3,268,032 A | * | 8/1966 | Dannels ................... | F16C 1/24 141/1 |
| 3,731,764 A | * | 5/1973 | Workman ................. | F16C 1/00 184/105.1 |
| 3,828,890 A | * | 8/1974 | Schott ...................... | D07B 7/12 118/405 |
| 3,889,781 A | * | 6/1975 | Schott ...................... | F16N 7/00 118/404 |
| 4,063,617 A | * | 12/1977 | Shenk ................... | H01B 13/228 118/405 |
| 4,066,147 A | * | 1/1978 | Toyomoto ................. | B62L 1/12 184/15.1 |
| 4,415,064 A | * | 11/1983 | Oliemuller ............... | F16C 1/24 184/105.1 |
| 4,545,461 A | * | 10/1985 | Dewyer .................... | F16C 1/00 141/383 |
| 4,572,332 A | * | 2/1986 | Pool ........................ | F16N 21/00 184/105.1 |
| 4,671,385 A | * | 6/1987 | Travis ....................... | F16C 1/24 118/404 |
| 4,749,059 A | * | 6/1988 | Jonnes ..................... | F16N 7/12 118/405 |

(Continued)

*Primary Examiner* — Henry Liu
(74) *Attorney, Agent, or Firm* — Larry Guernsey; Patent Law Office of Larry Guernsey

(57) ABSTRACT

A cable lubrication device for directing pressurized lubricant into the internal space of a control cable, the cable lubrication device having a main body tube, a locking ring, a plunger and a spiral-cut seal.

6 Claims, 7 Drawing Sheets

(56) References Cited

U.S. PATENT DOCUMENTS

| | | | | |
|---|---|---|---|---|
| 4,856,414 A * | 8/1989 | Churkin | B66D 1/28 | 118/405 |
| 4,891,037 A * | 1/1990 | Maples | B62J 31/00 | 184/15.1 |
| 4,892,005 A * | 1/1990 | Nagano | B62L 3/00 | 184/15.1 |
| 5,027,929 A * | 7/1991 | Ratke | B60R 25/02144 | 192/220.4 |
| 5,107,961 A * | 4/1992 | Schott | D07B 7/12 | 118/404 |
| 5,222,577 A * | 6/1993 | Nelson | F16C 1/24 | 184/105.1 |
| 5,326,292 A * | 7/1994 | Brushaber | B63H 25/10 | 114/144 R |
| 5,509,750 A * | 4/1996 | Boike | F16B 7/0413 | 403/164 |
| 5,632,356 A * | 5/1997 | Sells | H02G 1/08 | 184/15.1 |
| 5,636,709 A * | 6/1997 | Fujita | B62L 3/00 | 184/15.1 |
| 5,662,189 A * | 9/1997 | Anderson | F16C 1/24 | 184/15.1 |
| 5,785,152 A * | 7/1998 | Fujita | F16C 1/24 | 184/15.1 |
| 6,145,624 A * | 11/2000 | Tharpe | F16C 1/24 | 184/105.3 |
| 6,234,539 B1 * | 5/2001 | Foster | H02G 1/14 | 184/15.1 |
| 6,799,661 B1 * | 10/2004 | Tapscott, Jr. | F16C 1/24 | 184/15.1 |
| 6,957,720 B2 * | 10/2005 | Kuo | F16C 1/24 | 184/102 |
| 6,990,707 B1 * | 1/2006 | Heumann | B08B 1/008 | 118/208 |
| 7,992,685 B2 * | 8/2011 | Griffioen | H02G 1/086 | 184/15.1 |
| 2003/0146054 A1 * | 8/2003 | Kuo | B62K 23/06 | 184/15.1 |
| 2004/0035642 A1 * | 2/2004 | Coder | H02G 1/086 | 184/15.1 |
| 2004/0168857 A1 * | 9/2004 | Kuo | F16C 1/24 | 184/15.1 |
| 2007/0289819 A1 * | 12/2007 | Coder | H02G 1/08 | 184/15.2 |
| 2008/0035429 A1 * | 2/2008 | Coder | H02G 1/08 | 184/15.1 |
| 2008/0060878 A1 * | 3/2008 | Coder | H02G 1/08 | 184/15.1 |
| 2008/0067004 A1 * | 3/2008 | Coder | H02G 1/08 | 184/15.1 |
| 2008/0142305 A1 * | 6/2008 | Mesker | H02G 1/08 | 184/15.1 |

* cited by examiner

CABLE LUBRICATION DEVICE

TECHNICAL FIELD

The present invention relates generally to devices for maintaining and servicing mechanical parts and more particularly to tools for lubrication of cables in motorcycles or other wheeled vehicles.

BACKGROUND ART

Many motorized vehicles use cables to control certain functions of the machine, such as to actuate the throttle, clutch and brakes. A block drawing of a control cable is shown in FIG. 1. These control cables 1 generally include a central wire 2, which is surrounded by a protective sleeve 3, which also provides anchoring points for the overall assembly, whereby the sleeve 3 is fixed in position while the internal wire 2 is allowed to slide within. There is an internal space 4 between the inner side of the sleeve 3 and the outer surface of the wire 2, within which the wire 2 moves relative to the sleeve 3. The wire 2 also usually has a fitting 5 attached to the end of the wire 2, which is captured in a notch in some control mechanism, such as throttle, brakes, etc. by which the motion of the wire 2 is used to activate or regulate some function of the vehicle. The cable 1 has two ends, one of which may be more easily accessed, and will be called the near end 6. This near end 6 provides an access opening 7 to the internal space 4 between the inner side of the sleeve 3 and the outer surface of the wire 2, into which lubricant is sprayed or injected to provide easy translational movement between the wire 2 and the sleeve 3.

Almost all of these control cables need to be lubricated in order to reduce internal friction and extend the life of the cable. Generally, this is done by spraying or injecting lubricant into the internal space 4 through the access opening 7.

Previously, this required a nozzle of a can of pressurized lubricant to be mated to the access opening 7 of the near end 6 of the control cable 1. This mating was generally difficult since cables come in a variety of sizes and the nozzle of the lubricant can was not adaptable to this variety of configurations. Thus, the lubrication operation was usually a messy affair, which got a lot of lubricant on the user's hands or clothing and wasted a lot of mis-directed lubricant.

Attempts to address this problem have been made. An existing device is a clamp that uses a rubber sleeve with a tapered internal bore that is slit lengthwise such that it can be fitted over the end of the cable housing where the inner wire protrudes. This slit tapered rubber sleeve is set inside a clamping device that allows the user to compress the tapered rubber sleeve over the end of the cable housing where the inner wire protrudes. The idea is that the smaller end of the tapered rubber sleeve is clamped tight over the inner wire while the larger end of the tapered tube would be clamped around the cable housing and the slit in the sleeve clamped together. This device has one or two small round openings that are aligned with a similar openings in the tapered rubber sleeve that allow the user to introduce compressed lubricant with a wand. The lubricant is then directed into the space between the inner wire and the housing. However, in practice, these devices have not been able to provide anything close to a liquid tight seal against the inner wire of the cable because most inner wires consist of multiple strands of wire that are spiral wound and have flutes that allow liquid to go past the seal no matter how tightly it is clamped down onto the inner wire. In addition, in practice, the slit in the tapered sleeve is difficult to clamp together to prevent leakage of fluid because they cannot accommodate the large variations in cable housing diameter. As a result, in use, these devices leak substantial amounts of lubricant and allow substantial portions of the lubricant to be ejected from the device, and only the portion of the lubricant that is put in the device is actually forced into the cable that is being serviced. As a result, the existing device is very messy to use, does not make efficient use of lubricant, and does not allow complete cleaning or lubrication of the cable being serviced.

It should be noted that control cables are also used on non-motorized vehicles such as bicycles, and in many types of non-vehicular machinery. Lubricants also come in several varieties such as spray lubricants in aerosol cans, as well as lubricants which use other delivery devices, such as squeeze tubes and others.

Thus, there is a need for a control cable lubrication device which effectively directs lubricant into the internal space of a control cable.

DISCLOSURE OF INVENTION

Briefly, one preferred embodiment of the present invention is a cable lubrication device.

An advantage of the present invention is that it directs the flow of lubricant very efficiently.

Another advantage of the present invention is it minimizes spray of lubricant on the user's hands and clothing.

And another advantage of the present invention is it minimizes the waste of lubricant by directing it better to the areas of concern.

A further advantage of the present invention is there is a better seal formed with the pressurized source of lubricant, and therefore more pressure is concentrated into the cable, helping to push out debris that has formed inside the cable sleeve.

A yet further advantage of the present invention is that since there is a better seal formed between the device and the pressurized lubricant source, the lubricant is more evenly dispersed throughout the internal space of the control cable.

A still further advantage of the present invention is that since there is a better seal formed between the device and the pressurized lubricant source, there is less leakage of excess lubricant onto the user, and thus less exposure to hazardous chemicals during the lubrication process.

These and other advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

DETAILED DESCRIPTION OF THE PREFERRED EMBODIMENTS

The present invention is cable lubrication device, which will be referred to by the reference number 10, and thus shall be referred to as cable lubricator 10. A preferred embodiment of the cable lubricator 10 is illustrated in FIGS. 2-8.

Figure 1:
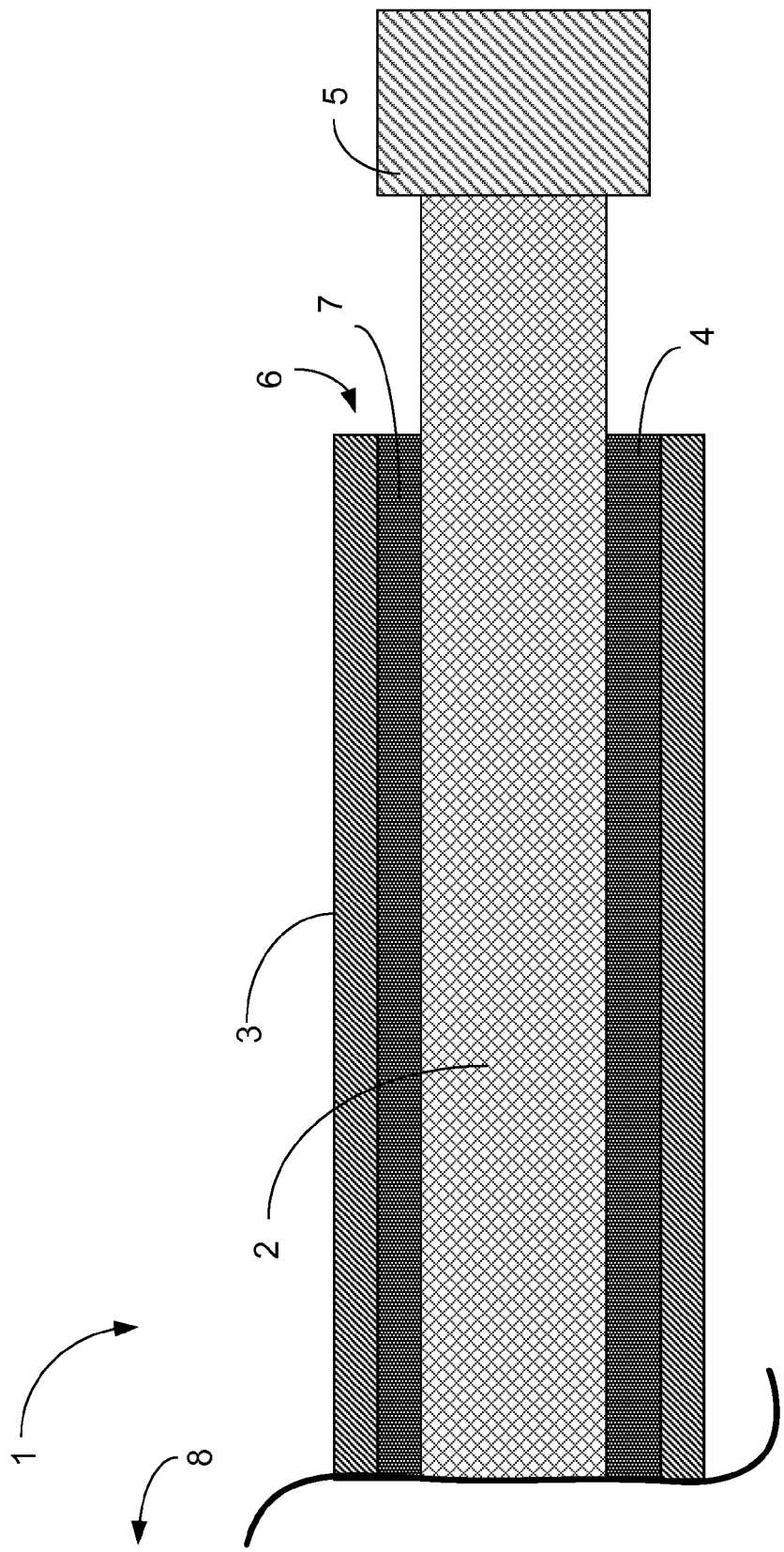
FIG. 1 shows a cut-away view of a control cable which is used with the present invention.
Figure 2:
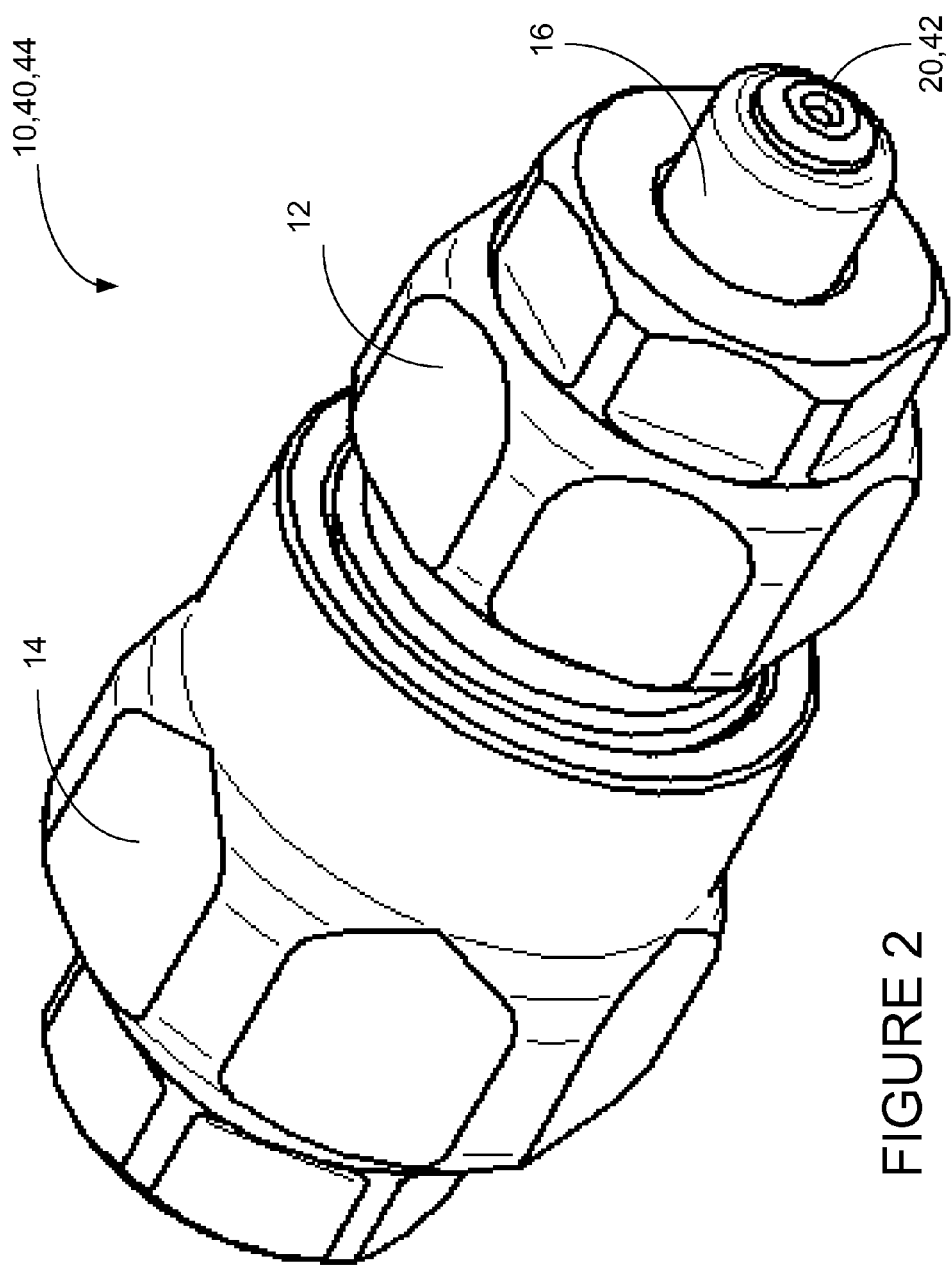
FIG. 2 shows an isometric view of the cable lubrication device of the present invention.
Figure 3:
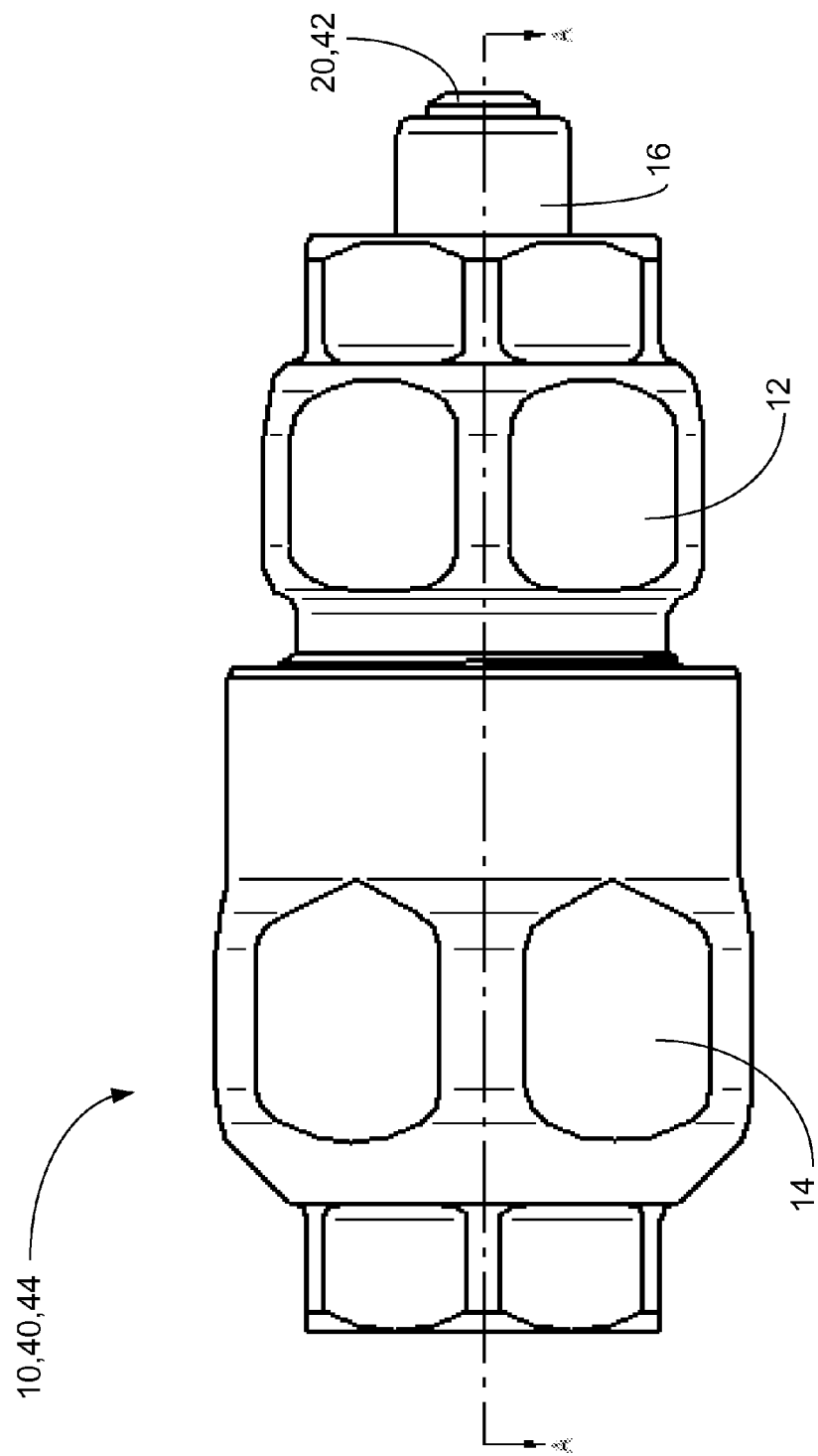
FIG. 3 shows a plan view of the cable lubrication device of the present invention.
Figure 4:
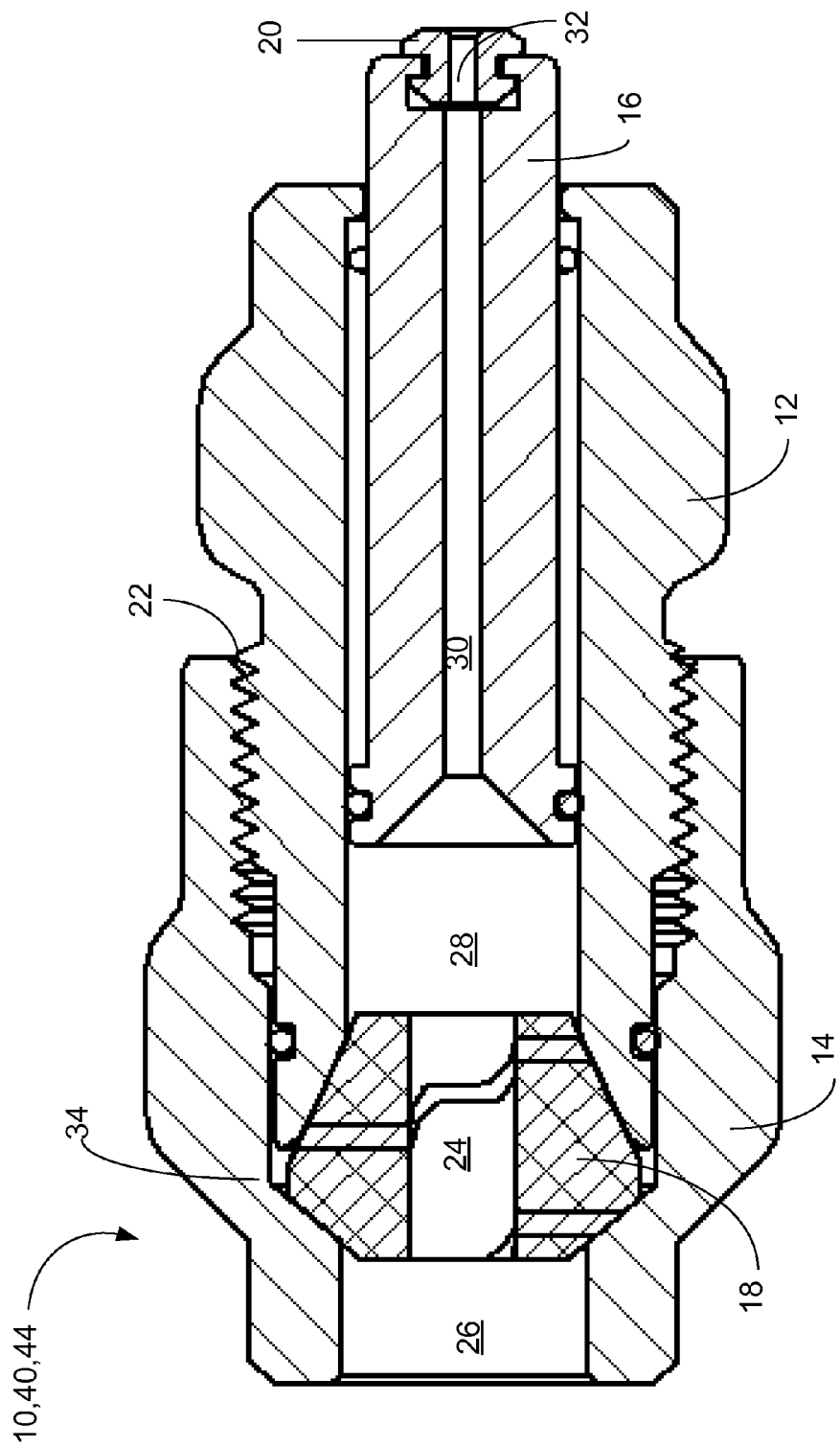
FIG. 4 shows a cut-away view of the cable lubrication device of the present invention as taken through line A-A of FIG. 3.

FIGS. 2-4 shows the present cable lubricator 10, with FIG. 2 showing an isometric view, FIG. 3 showing a plan view and FIG. 4 showing a cut away view taken through line A-A of FIG. 3. The cable lubricator 10 includes a main body tube 12, a locking ring 14, a plunger 16, a spiral-cut seal 18, and a plunger plug 20.

As best seen in cut-away view of FIG. 4, the main body tube 12 and the locking ring 14 are joined together by screw threads 22, by which the locking ring 14 can be screwed down onto the main body tube 12. Inside the cable lubricator 10, there is a spiral-cut seal 18, which is compressed inwardly when the locking ring 14 is advanced on the screw threads 22 towards the main body tube 12. The spiral-cut seal has a central cavity 24, which will receive the control cable (not shown in this view). The locking ring 14 also has a central cavity 26, the main body tube 12 has central cavity 28, plunger 16 has central cavity 30, and plunger plug 20 has central cavity. In addition to central cavity 26, the locking ring 14 also has a larger bore central cavity 34 which receives the spiral-cut seal 18 and threadably engages the main body tube 12 within this larger bore central cavity 34.

Figure 5C:
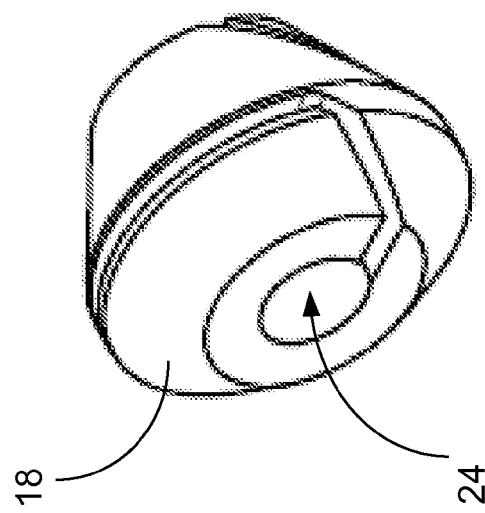
FIGS. 5A-C show views of the spiral-cut seal of the cable lubrication device of the present invention.
Figure 5B:
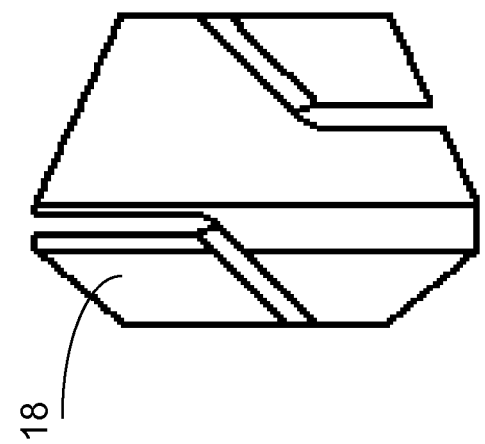
Figure 5A:
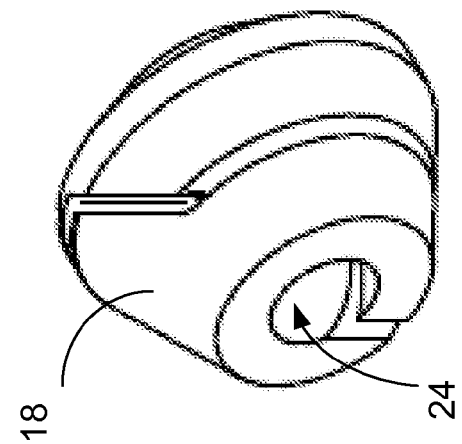

FIGS. 5A-C show various views of the spiral-cut seal 18. This is made so that when pressure is applied to the outer surface of the seal 18, the central opening 24 constricts around the control cable. The seal 18 also seals off the central cavity 26 of the locking ring 14 to pressurize the enclosure and prevent lubricant from escaping.

In practice, control cables 1 of various sizes and configurations are engaged by the cable lubricator 10. Two such examples are shown in cut-away FIGS. 6 and 7.

Figure 6:
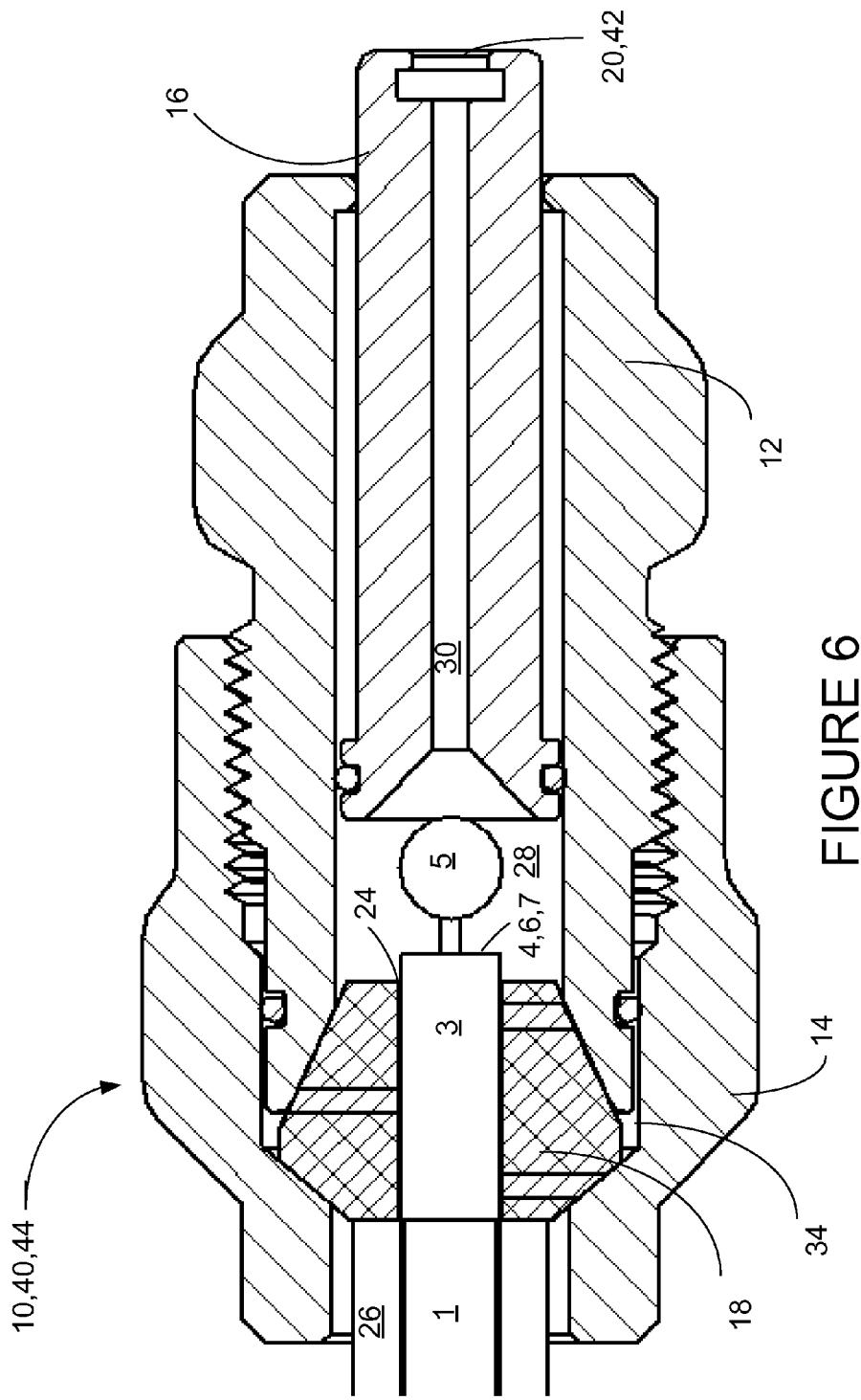
FIG. 6 shows a cut-away view of the cable lubrication device of the present invention surrounding the near end of a control cable.

FIG. 6 shows a control cable 1 having wire 2 and sleeve 3, and fitting 5. Wire 2 emerges from near end 6, having access opening 7 into which lubricant is desired to be injected. With the locking ring 14 unscrewed to its most open position, the near end of the control cable 1, including its fitting 5 are inserted into the central cavity 26 of the locking ring 14. The spiral-cut seal 18 will be in its most expanded position, which allows the opening of its central cavity 24 to be at its widest radius, allowing the insertion of the fitting 5 and near end 6 of the control cable 1, which are then positioned within the central cavity 28 of the main body tube 12. When the control cable 1 has been inserted, the locking ring 14 is then advanced on internal screw threads 22 on main body tube 12, which serves to compress the spiral-cut seal around the sleeve 3 of the control cable 1. This anchors the cable in position and prevents pressurized lubricant from escaping the cable lubricator 10 through the locking ring's central cavity 26 opening.

Plunger 16 then is advanced inward within central cavity 28 of the main body tube 12 to reduce the internal volume of the central cavity 28, and thus direct the pressurized lubricant more efficiently. The exact spacing is not critical, but by reducing the volume of the cavity space 28, lubricant can be directed more efficiently into the access opening 7 and into the internal space.

A pressurized source of lubricant (not shown) is then connected to the central cavity 30 of the plunger 16, preferably through a flexible tube which mates securely with the opening at the end of the plunger 16. This connection is optionally aided by one of a variety of plunger plugs 20, or adaptors, each having a central cavity 32, of which there may be a variety of sizes to fit various flexible tubes of various pressurized lubricant sources.

The pressurized source of lubricant is then activated. The lubricant is efficiently directed through the central cavity 30 of the plunger 16, into the central cavity 28 of the main body tube 12, into the access opening 7 of the near end 6 of the control cable 1, and into the internal space 4 between the sleeve 3 and the wire 2 to lubricate the cable.

Figure 7:
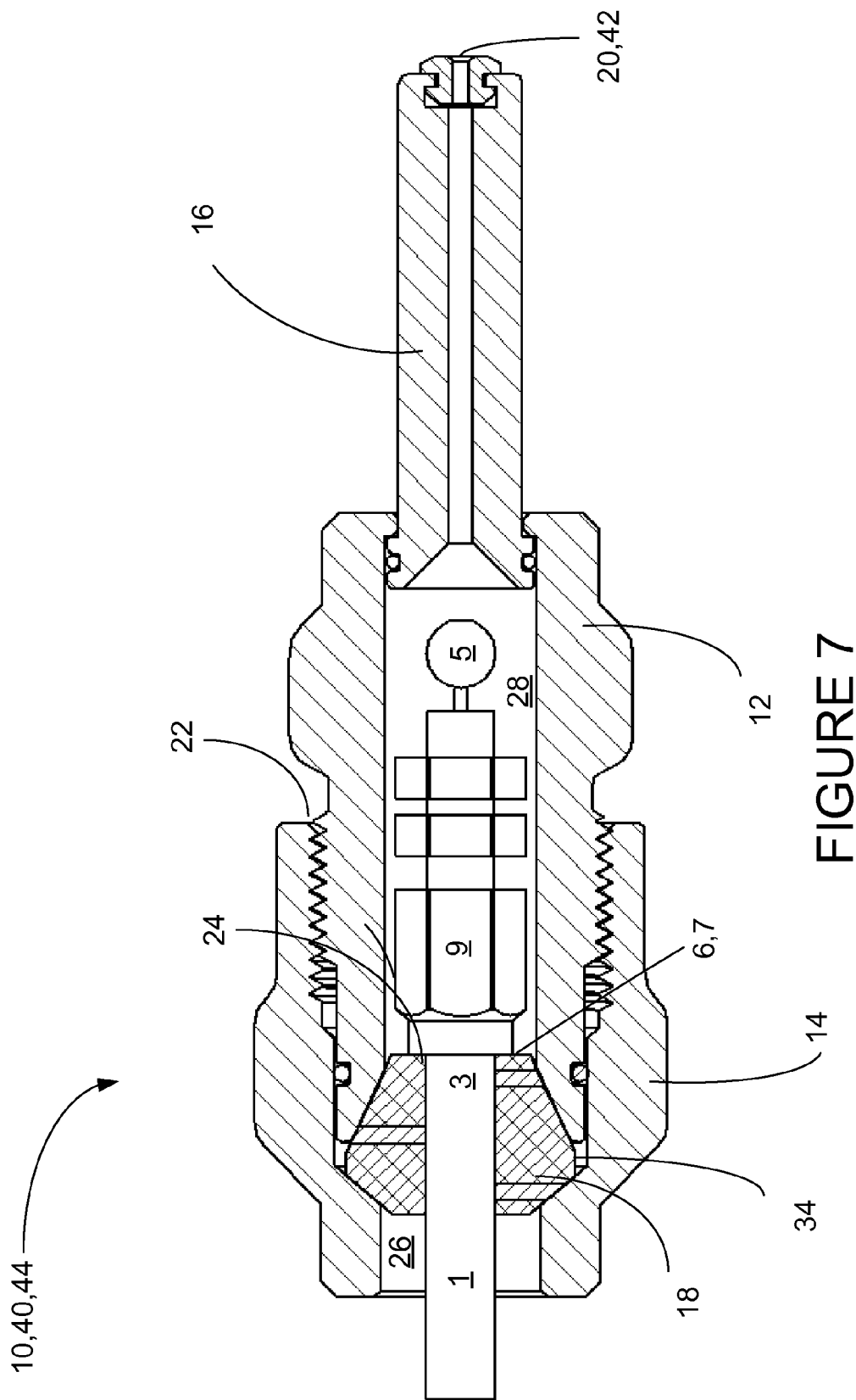
FIG. 7 shows a cut-away view of the cable lubrication device of the present invention surrounding the near end of a second type of control cable.

It is to be understood that control cables have a wide variety of diameters and fittings. A second variety of control cable 1 is shown in FIG. 7, which has been installed in the cable lubrication device 10. This variation has a locking nut 9 which may be used to secure the near end 6 of the control cable 1 to a fitting on some part of the vehicle, perhaps to a portion of the handle bars or other site. This locking nut 9 has a wider diameter than seen in the previous variation and the end fitting 5 is at a further distance from the access opening 7. The central cavity 28 of the main body tube 12 of the present cable lubrication device 10 is sized large enough to accommodate many varieties of such configurations by use of the plunger 16, which in this case has been backed outward to its furthest extent. The spiral-cut seal 18 is expandable when not compressed so that fittings such as the locking nut 9 can pass through the central cavity 24, but then compresses down to grip the sleeve 3 of the control cable when the locking ring 14 is tightened upon the main body tube 12.

The cable lubrication device 10 can be seen as a pressurized enclosure 40 which completely surrounds the near end 6 and access opening 7 of a control cable 1, while providing an access portal 42 for introducing pressurized lubricant into the access opening 7 of the control cable 1. The main body tube 12, locking ring 14, plunger 16 and spiral-cut seal 18 act together to form a shell enclosure 44, which allows the efficient application of pressurized lubricant to the internal spaces 7 of a variety of control cables 1.

While various embodiments have been described above, it should be understood that they have been presented by way of example only, and not limitation.

INDUSTRIAL APPLICABILITY

The present cable lubricator 10 is well suited generally for use in lubricating control cables in motorcycles, bicycles, other vehicles, and other uses of control cables not involving vehicles.

The cable lubricator 10 includes a main body tube 12, a locking ring 14, a plunger 16, a spiral-cut seal 18, and a plunger plug 20. The main body tube 12 and the locking ring 14 are joined together by screw threads 22, by which the locking ring 14 can be screwed down onto the main body tube 12. Inside the cable lubricator 10, there is a spiral-cut seal 18, which is compressed inwardly when the locking ring 14 is advanced on the screw threads 22 towards the main body tube 12. The spiral-cut seal has a central cavity 24, which will receive the control cable (not shown in this view). The locking ring 14 also has a central cavity 26, the main body tube 12 has central cavity 28, plunger 16 has central cavity 30, and plunger plug 20 has central cavity. In addition to central cavity 26, the locking ring 14 also has a larger bore central cavity 34 which receive the spiral-cut seal 18 and threadably engages the main body tube 12 within this larger bore central cavity 34.

In practice, control cables 1 of various sizes and configurations can be engaged by the cable lubricator 10. With the locking ring 14 unscrewed to its most open position, the near end of the control cable 1, including its fitting 5 are inserted into the central cavity 26 of the locking ring 14. The spiral-cut seal 18 will be in its most expanded position, which allows the opening of its central cavity 24 to be at its widest radius, allowing the insertion of the fitting 5 and near end 6 of the control cable 1, which are then positioned within the central cavity 28 of the main body tube 12. When the control cable 1 has been inserted, the locking ring 14 is then advanced on internal screw threads 22 on main body tube 12, which serves to compress the spiral-cut seal around the sleeve 3 of the control cable 1. This anchors the cable in position and prevents pressurized lubricant from escaping the cable lubricator 10 through the locking ring's central cavity 26 opening.

The plunger 16 is then advanced within the central cavity 28 of the main body tube 12 until the end of the plunger is proximate to the fitting 5. The exact spacing is not critical, but by reducing the volume of the cavity space 28, lubricant can be directed more efficiently into the access opening 7 and into the internal space.

A pressurized source of lubricant is then connected to the central cavity 30 of the plunger 16, preferably through a flexible tube which mates securely with the opening at the end of the plunger 16. This connection is optionally aided by one of a variety of plunger plugs 20, or adaptors, each having a central cavity 32, of which there may be a variety of sizes to fit various flexible tubes of various pressurized lubricant sources.

The pressurized source of lubricant is then activated. The lubricant is efficiently directed through the central cavity 30 of the plunger 16, into the central cavity 28 of the main body tube 12, into the access opening 7 of the near end 6 of the control cable 1, and into the internal space 4 between the sleeve 3 and the wire 2 to lubricate the cable.

It is to be understood that control cables may have a wide variety of diameters and fittings. Some variations may have a locking nut 9 which has a wider diameter than in the other variations and the end fitting 5 which is at a further distance from the access opening 7. The central cavity 28 of the main body tube 12 of the present cable lubrication device 10 is sized large enough to accommodate many varieties of such configurations by use of the plunger 16, which may be backed outward to its furthest extent. The spiral-cut seal 18 is expandable when not compressed so that fittings such as the locking nut 9 can pass through the central cavity 24, but then compresses down to grip the sleeve 3 of the control cable when the locking ring 14 is tightened upon the main body tube 12.

The cable lubrication device 10 can be seen as a pressurized enclosure 40 which completely surrounds the near end 6 and access opening 7 of a control cable 1, while providing an access portal 42 for introducing pressurized lubricant into the access opening 7 of the control cable 1. The main body tube 12, locking ring 14, plunger 16 and spiral-cut seal 18 act together to form a shell enclosure 44, which allows the efficient application of pressurized lubricant to the internal spaces 7 of a variety of control cables 1.

Although the present cable lubrication device 10 is useful with motorcycle control cables, it can be used on a variety of other cables for other types of vehicles such as bicycles, or in many other uses of control cables not involving vehicles. The use of the present invention should not be construed as limited from these other uses.

For the above, and other, reasons, it is expected that the present cable lubrication device 10 of the present invention will have widespread industrial applicability. Therefore, it is expected that the commercial utility of the present invention will be extensive and long lasting.

What is claimed is:

1. A cable lubrication device, comprising:
    a shell enclosure, including a central cavity, which completely surrounds the near end of a control cable having an access opening for receiving lubricant wherein said shell enclosure comprises a main body tube, a locking ring, a plunger and a spiral-cut seal.

2. The cable lubrication device of claim 1, wherein said shell enclosure further comprises:
    an access portal.

3. A pressurized enclosure for directing pressurized lubricant into the internal space of a control cable, the pressurized enclosure comprising:
    a main body tube;
    a locking ring;
    a plunger; and
    a spiral-cut seal.

4. The pressurized enclosure of claim 3, wherein said pressurized enclosure further comprises:
    an access portal.

5. A shell enclosure for directing pressurized lubricant into the internal space of a control cable, the shell enclosure comprising:
    a main body tube;
    a locking ring;
    a plunger; and
    a spiral-cut seal.

6. The shell enclosure of claim 5, wherein said shell enclosure further comprises:
    an access portal.

* * * * *